April 27, 1937. W. F. MacGREGOR Re. 20,342

COMBINATION THRESHER AND WINDROW PICK-UP

Original Filed Feb. 27, 1926 5 Sheets-Sheet 1

INVENTOR
WALLACE F. MACGREGOR,
BY James A. Walsh
ATTORNEY

April 27, 1937. W. F. MacGREGOR Re. 20,342

COMBINATION THRESHER AND WINDROW PICK-UP

Original Filed Feb. 27, 1926 5 Sheets-Sheet 2

INVENTOR
WALLACE F. MAC GREGOR,
BY James A. Walsh,
ATTORNEY

April 27, 1937. W. F. MacGREGOR Re. 20,342

COMBINATION THRESHER AND WINDROW PICK-UP

Original Filed Feb. 27, 1926 5 Sheets-Sheet 3

INVENTOR
WALLACE F. MACGREGOR,
BY James A. Walsh,
ATTORNEY

April 27, 1937. W. F. MacGREGOR Re. 20,342

COMBINATION THRESHER AND WINDROW PICK-UP

Original Filed Feb. 27, 1926 5 Sheets-Sheet 4

INVENTOR
WALLACE F. MACGREGOR,
BY James A. Walsh,
ATTORNEY

April 27, 1937. W. F. MacGREGOR Re. 20,342
COMBINATION THRESHER AND WINDROW PICK-UP
Original Filed Feb. 27, 1926 5 Sheets-Sheet 5
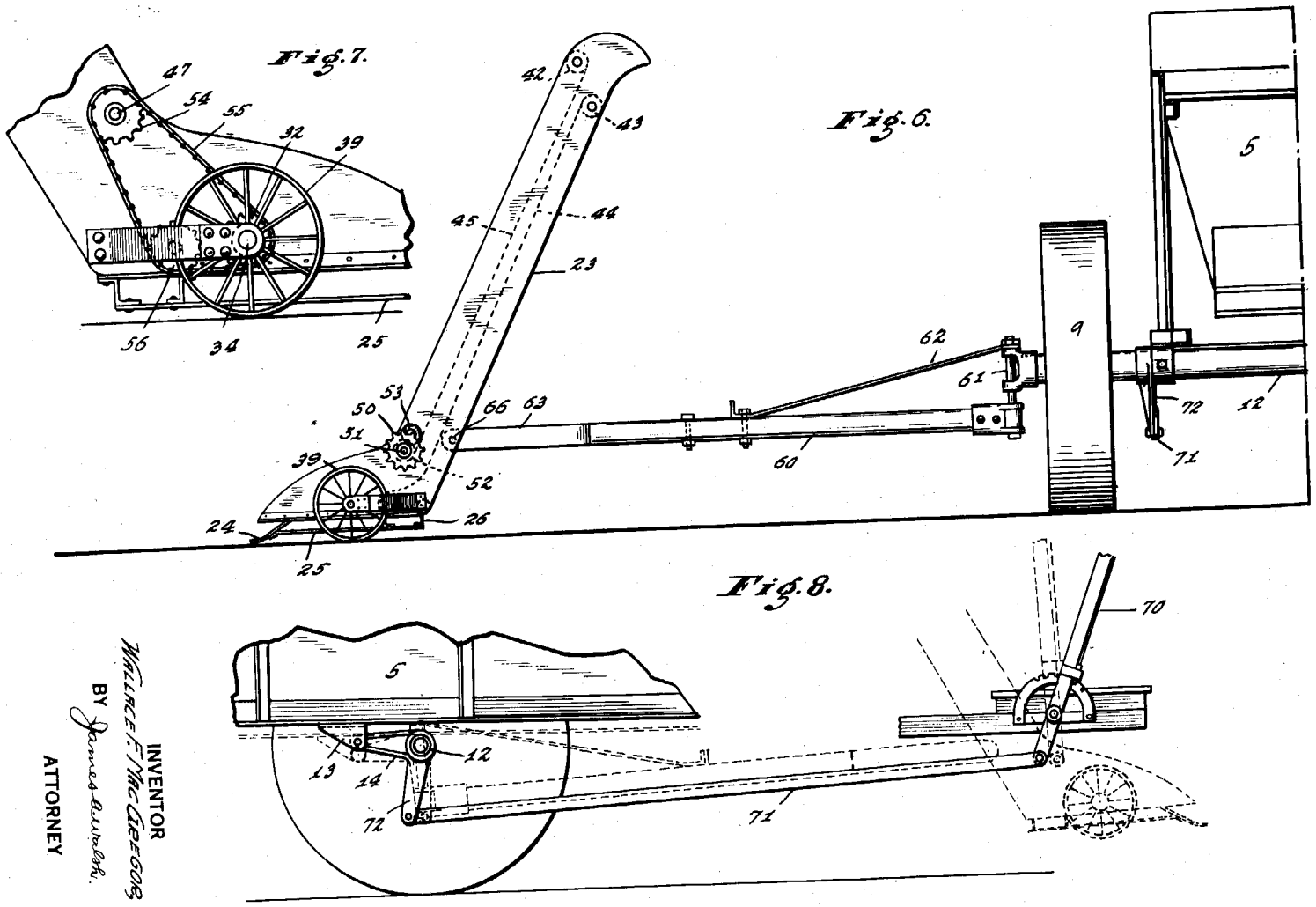
INVENTOR
WALLACE F. MAC GREGOR,
BY James A. Walsh.
ATTORNEY Reissued Apr. 27, 1937

Re. 20,342

UNITED STATES PATENT OFFICE 20,342

COMBINATION THRESHER AND WINDROW PICK-UP

Wallace F. MacGregor, Racine, Wis., assignor to J. I. Case Company, Racine, Wis., a corporation Original No. 1,919,896, dated July 25, 1933, Serial No. 91,049, February 27, 1926. Application for reissue March 21, 1935, Serial No. 12,304

18 Claims. (Cl. 56—364)

Combination harvester-threshers are especially adapted for use in regions where climatic conditions are conducive to the uniform ripening or maturing of small grain, such as wheat and the like, so that the crop may be sufficiently ripened and dried to permit of its being cut and threshed at one operation of the combined travelling machinery through the field, which method is recognized as highly economical in that not only considerable time and labor are saved, but material saving of grain is accomplished for the reason that in this manner of cutting and threshing frequent handling and consequent shattering of the grain is avoided, whereas in localities where the practice prevails of cutting, binding and shocking the grain, and then hauling it to a thresher stationed at a distant point, serious loss of grain occurs incident to the various operations stated. In some regions where the combination harvester is used it occurs that the humidity or rainfall retards the uniform drying and ripening of the standing grain and prevents it from being kept in proper condition in bulk if cut and threshed at the same operation, and immediately stored, which is the practice, and, therefore, the use of the harvester-thresher, for the best results, is limited to operations in grain sufficiently matured and dried for immediate storage, so that in fields where one or more portions of the crop has not properly matured for cutting and threshing it is quite common to leave those portions uncut until such ripening occurs, which necessitates the return of the machinery to harvest such remaining grain. It is the object of my invention to improve the situation explained by rendering available some of the advantages and economies of the combination harvester method to crops grown under such climatic conditions, and which may be accomplished in the manner and by the mechanisms to be described.

Figure 1:
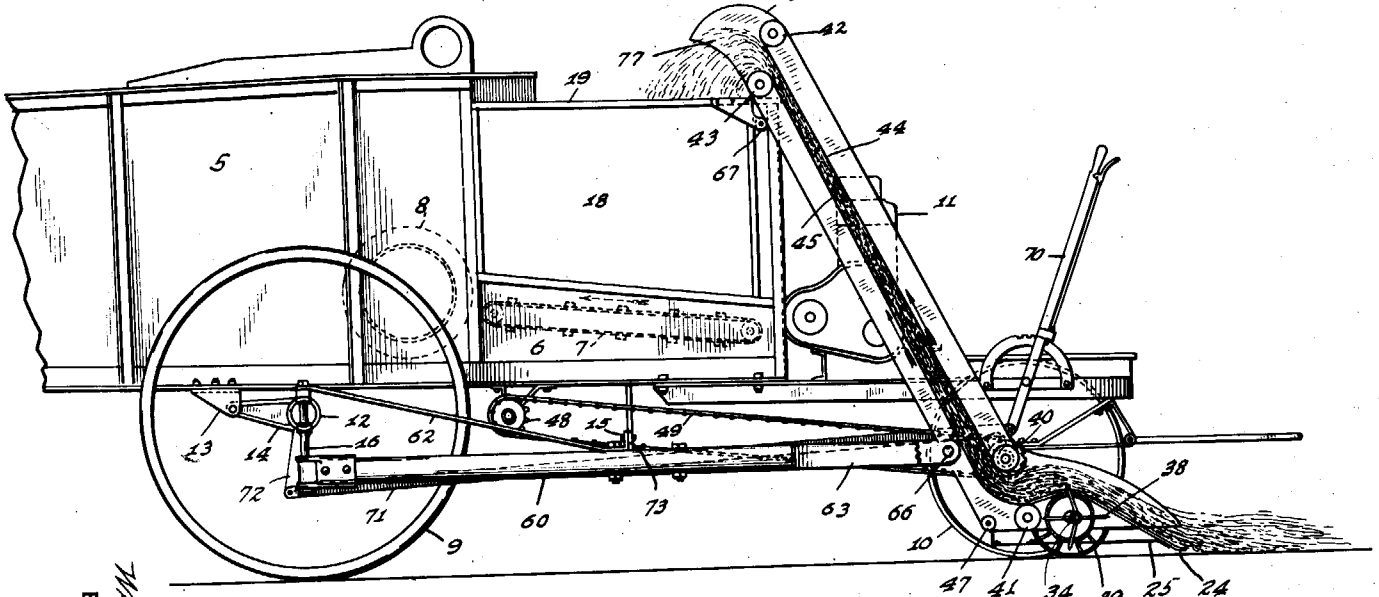
Figure 2:
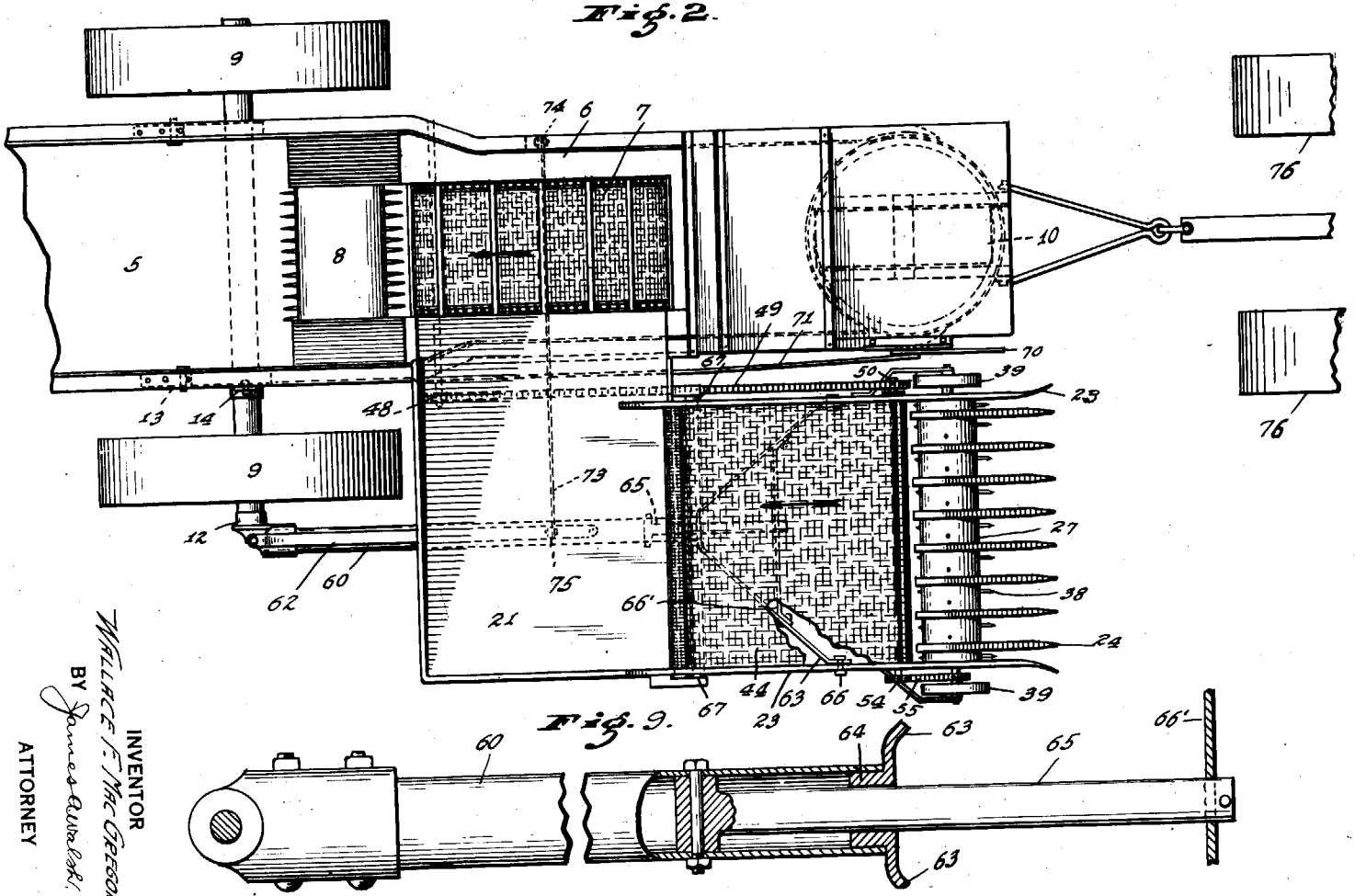
Figure 3:
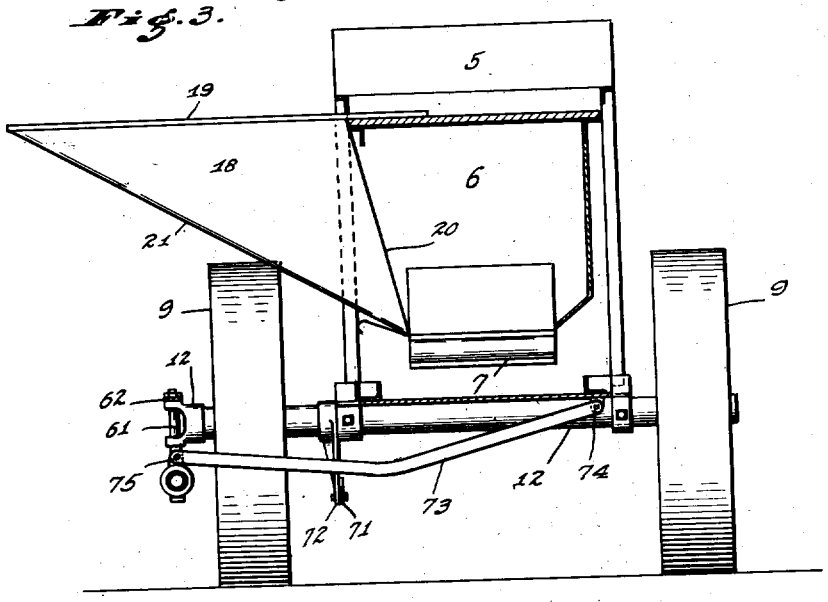
Figure 5:
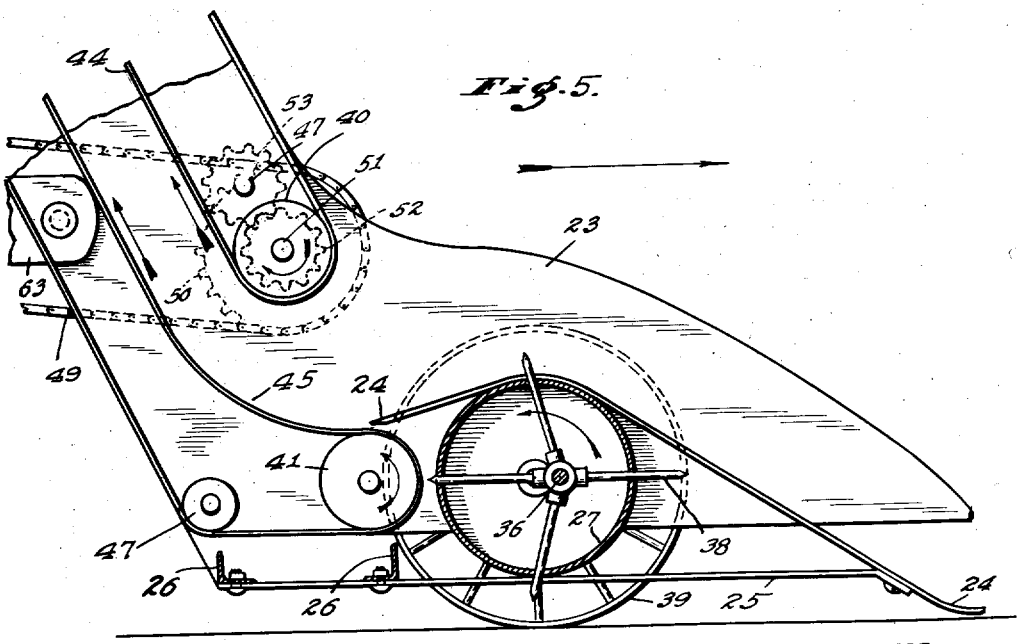
Figure 4:
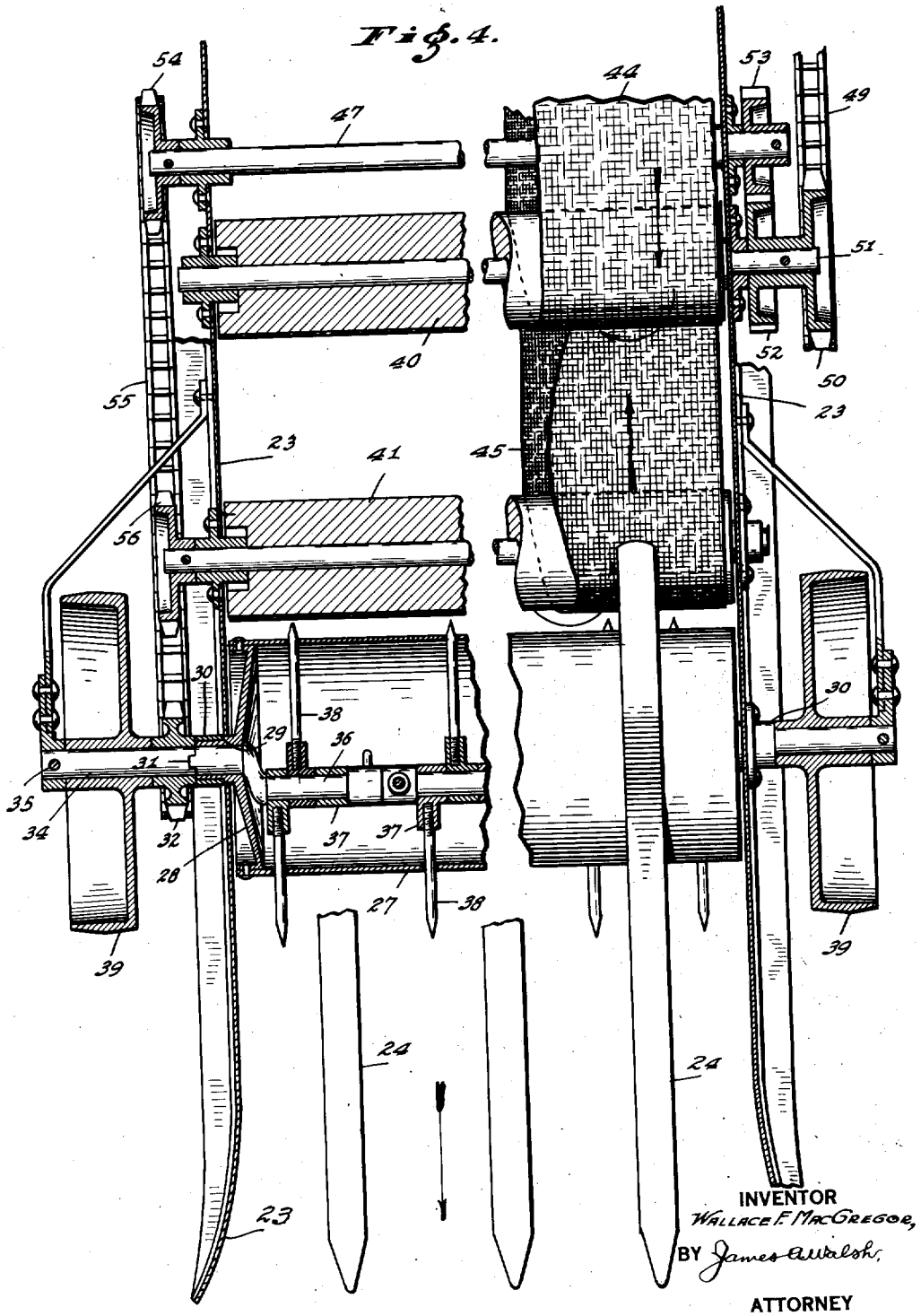

In the accompanying drawings, forming part hereof, Figure 1 indicates a windrow thresher embodying my improvements; Fig. 2 a plan of the same; Fig. 3 a front elevation of the thresher and a hopper used in connection therewith; Fig. 4 a plan of certain details of the windrow pick-up forming part of my improved machine; Fig. 5 a fragmentary section of the pick-up; Fig. 6 a front elevation of the thresher showing said pick-up swung away therefrom; Fig. 7 a detail of the lower portion of said pick-up showing driving connections therefor; Fig. 8 a detail of controlling mechanism for the thresher; and Fig. 9 a detail plan of the supporting member for said pick-up.

In said drawings the portions marked 5 indicate the thresher element of my improved combination machine, which thresher may be of any desired construction and arrangement, that shown being of the character disclosed in Letters Patent No. 1,568,679, issued January 5, 1926, upon my application, and which preferably embodies a feeder housing 6, containing a conveyer 7, into the side of which housing grain is conveyed to the thresher cylinder 8, from which it is propelled and further separated by suitable mechanisms in the machine in a well known manner. Said thresher is mounted upon carrying wheels 9, 10, and is adapted to be operated by a self-contained motor 11, or otherwise. Wheels 9 are connected by a rocking axle 12, secured to a bracket 13, by arms or levers 14 pivotally mounted in said brackets and fixedly secured to said axle, in the manner and for the purpose shown and described in said patent.

At the entrance to said feeder housing 6 I position a gravity hopper 18 having its upper side 19 and discharge end 20 open, while its bottom 21 comprises an inclined or sloping floor by which grain discharged into said hopper will by gravity be deposited upon the conveyer 7 for delivery to the cylinder 8; and while I have chosen to illustrate and describe such means for conveying grain into the thresher I desire it to be understood that any practical means for the purpose may be employed such as an endless conveyer, vibrating mechanism, blower or otherwise.

In combination with said thresher 5 I employ a windrow gatherer embodying pick-up, conveying or elevating and other mechanisms. Said pick-up comprises a suitable frame 23 having fingers 24 secured to its lower end by the members 25, which are attached to braces 26 (Fig. 5), and underneath said fingers I position a drum 27 having heads 28 embodying hollow trunnions 29 mounted in bearings 30, one of said trunnions having driving ears 31, which clutch with a driving sprocket 32. Through said trunnions 29 extends an offset shaft 34 locked against rotation by pins 35, which said shaft 34 constitutes a stationary crankshaft having the portion thereof intermediate its ends, as 36, eccentric to said drum, and upon which shaft is mounted, in collars 37, a plurality of fingers 38 adapted to revolve about said shaft as they are propelled around by the rotating drum 27, and because of the eccentric relation between said fingers and drum they alternately project and recede through said drum during its revolution. The pick-up is provided with suitable depth gaging means such as the wheels 39 mounted upon shaft 36, which serve to prevent the fingers 24 from gouging into the ground, which fingers preferably terminate in the rear of drum 27, in which portion of the pick-up frame I provide a conveyer and elevator, comprising the guide rollers 40, 41, which are adapted respectively to cooperate with upper guide rollers 42, 43, in supporting and actuating belts 44, 45, in the direction indicated by the arrows in Fig. 1, belt 45 preferably running around a countershaft 47. The canvas drive-roller 40 may be driven from any convenient source on the thresher, as the sprocket 48, connected by chain 49 to a sprocket 50 on shaft 51 of said roller. Also mounted on shaft 51 is a spur gear 52, which drives a companion spur-gear 53 on the end of countershaft 47, and on the opposite end of said countershaft is a sprocket 54 about which runs a sprocket chain 55, and connects the same to roller sprocket 56 and drive-roller sprocket 32. By this method of driving it will be seen that the rollers 40, 41 are driven in opposite directions, so that the adjacent runs of the canvas belting engaging the grain will travel together in the same direction, as indicated by the arrows in Fig. 1.

To the axle 12 I secure a supporting arm 60 by means of a universal or other coupling, as a pin 61 passing through said axle, which will permit the vertical and horizontal swinging of said arm, and which support 60 may be reinforced by a truss-brace 62. Upon the outer end of said arm I rotatably mount a pair of carrying arms 63, which may be secured thereto by a swiveling sleeve 64 mounted on shank 65, said arms being pivotally connected at 66 to each side of the pick-up, and connected by a brace 66', so that said arm 60 is in effect a bifurcated member designed to support the pick-up from the thresher, and the pick-up, being pivotally supported thereby is free to swing, and normally assumes the inclined position indicated in Fig. 1, preferably contacting with rollers 67 at each side of hopper 18 in order that it may readily ride in relation thereto as the machinery vibrates. By this means the elevator portion of the pick-up is not only permitted to move upwardly and downwardly, but also laterally toward and away from the thresher incident to the irregular movement of the pick-up when it rocks through its connection 64 with the supporting arm 60, so that it is maintained in parallel relation to the ground regardless of the inequalities thereof which it encounters.

As hereinbefore indicated, the weight of the thresher is sustained by the rearwardly extending arms 14, so that the pick-up is counterbalanced in a manner similar to the harvester as shown in my patent referred to and although the pick-up is substantially balanced by such weight it is not entirely counterbalanced, being of sufficient weight itself to normally remain in contact with the ground. However, when it is desired to raise the pick-up to pass obstructions in the field, or when moving from one place to another, said windrow pick-up may be readily lifted clear of the ground as indicated by the dotted lines in Fig. 8, by manipulating a hand lever 70 on the thresher, which is connected by a link 71 to a rocker arm 72, secured to the thresher axle 12, by which means said axle may be rocked to vertically move the thresher and which action in turn raises or lowers the loader in directions opposite to the movements of the thresher. The entire windrow pickup, except the gravity hopper 18, is maintained in its relation to the thresher by a retaining link 73 pivoted to the thresher at 74, and to the supporting arm at 75, and therefore it will be understood that as said supporting arm is hingedly connected to the axle 12 by the coupling 61 the pick-up may be swung away from the thresher, as indicated in Fig. 6, for convenient access thereto and to the thresher or motor in making adjustments or repairs.

In the circumstances hereinbefore described, where the grain is not sufficiently ripened to permit cutting and threshing all or portion of the crop by a combination harvester-thresher in the usual way, such grain may be first cut and deposited upon the ground in windrows by a suitable machine, as is the practice in cutting hay, or such operation may be performed by one or more binders having the binding attachments removed therefrom, or a header with its elevator removed. It may be explained that where two or more binders are employed for the purpose, one may be run behind the other and so arranged as to discharge the cut grain in a common windrow; but any practical machinery for placing the cut grain in windrows or piles will be complementary to my machine, as the object in windrowing such grain is to arrange it loosely along the ground so that it will dry and ripen quickly, and thus the harvesting operations expedited, for it will be understood that it is highly important and generally necessary to gather and thresh the crop the moment the ripened or matured stage has arrived. As will be understood from Fig. 2, I provide a comparatively compact combination thresher and windrow-pick-up for the purpose described, and so arranged that the tractor, indicated at 76 (or animals), may be attached directly in front of the thresher, thus avoiding side draft and at the same time permitting the latter to move alongside the windrow, and as the pick-up travels into the windrow, removing the grain and delivering it into the side or feeder housing of the thresher, the crop is gathered quickly and without trampling or damage from the moving machinery, which condition will arise if the grain is delivered in a straight line from the field through the front of the thresher to its cylinder. And it may be further explained that in the use of my improved windrow thresher the pick-up element may be attached to a standard combination harvester-thresher in place of the harvester or header element thereof, so that the user of such a machine may cut a part of the crop to be deposited in windrows, and threshed by the thresher equipped with the pick-up, and later when the standing grain has properly matured, the pick-up may be detached from the machine and the harvester substituted therefor so that the remainder of the crop may be cut and threshed at one operation in the usual way practiced with a combination harvester-thresher.

In operation, the combination machine is so guided that the pick-up will move into the windrow while the thresher travels through the field where the grain has been cut, and as the pick-up advances, the fingers 24 pick up the loose grain-laden straws, which move along over the group of fingers and are urged toward the elevator portion of the pick-up by the revolving fingers 38 in the drum 27, which revolving fingers pass between said fingers 24 and penetrate the straw, carrying it along as said drum rotates each set of revolving fingers 38 after propelling the straw to the canvas belt 45 receding within the drum substantially as shown in Fig. 5, which drum, as indicated by the arrow rotates in a direction opposite to that of the depth gage wheels 39. The finger members 25 are preferably made of spring material so that when fingers 24 strike obstructions they will yield and pass thereover. During such movement of the straw the elevator belts 44, 45, cooperate to convey the material upwardly and deliver the same from its mouth 77 into the sloping hopper 18, from which it moves by gravity into the feeder-housing 6 of the thresher to be threshed and separated. While thus traveling the gage wheels 39 follow the ground inequalities and thus maintain the fingers 24 in proper relation to the soil, and, as the pick-up is pivotally mounted upon its supporting arm, which latter is linked to the thresher as stated, it is enabled to follow the movement of the thresher without strain, and by which means in connection with the variable coupling between said arm and the thresher I provide stable but yielding connections between the thresher and pick-up elements of the combination machine.

I claim as my invention:

1. In a windrow pick-up, means at its forward side for removing cut grain from the soil, a revolving drum positioned rearwardly of and cooperating with said means, fingers in the drum adapted to project and recede in relation thereto for propelling the cut grain, and means for receiving said grain from the fingers and discharging the same from the pick-up.

2. In a windrow pick-up, flexible means secured thereto and connecting the pick-up to a threshing machine, a revolving drum on the pick-up, fingers within the drum adapted to project and recede therethrough, means for rotating the drum, fingers projecting from the forward end of the pick-up for removing grain from the soil and delivering the grain to the drum, and a conveyer adjacent the drum for receiving the grain therefrom and discharging said grain from the pick-up.

3. In a windrow pick-up, a support therefor, means for connecting the pick-up to the support, wheels mounted on the pick-up, a plurality of fingers extending forwardly from the pick-up for removing grain from the soil, a revolving drum adjacent said fingers, revolvable fingers in the drum and actuated thereby to project through said plurality of fingers for moving grain thereover from the forwardly extending fingers and to recede within said drum and disengage from said grain, and means for receiving the grain from said drum and conveying such grain to a thresher.

4. In a windrow pick-up, a support therefor, means for connecting said pick-up thereto, depth-gaging means mounted upon said pick-up, a plurality of fingers for removing grain from the soil, a revolving drum beneath said fingers, revolvable fingers in the drum and actuated thereby to project through said plurality of fingers for moving grain thereover and to recede within said drum and disengage from said grain, and means for conveying the grain to a thresher.

5. A windrow pick-up comprising a supporting member adjustable toward and away from a thresher, means for pivotally connecting said pick-up to said member whereby the pick-up may be swung backwardly and forwardly in relation to the supporting member, depth-gaging means mounted on said pick-up, stationary fingers on said pick-up projecting forwardly therefrom, a drum on said pick-up having revolving fingers passing between said stationary fingers for removing material rearwardly thereover, and a conveyer adjacent said drum for conveying material from the latter.

6. In a machine of the character described, a support, a pick-up rockingly mounted on said support comprising stationary fingers positioned forwardly thereof in proximity to the soil, a drum adjacent and rearwardly of said fingers, revolvable fingers in the drum and actuated thereby to move grain over said stationary fingers and to recede within the drum and disengage from the grain, and elevator belts adjacent the drum for receiving grain from the latter and conveying and discharging the same from the pick-up.

7. In a machine of the class described, a thresher, a pick-up, an arm supporting the pick-up, means for pivotally connecting the arm to the thresher, and a retaining member connected to the thresher and to said supporting arm whereby the pick-up is maintained in its parallel relation to the thresher.

8. In a machine of the class described, a thresher having a rocking axle, a pick-up embodying means for removing material from the ground, an arm on the pick-up in parallel relation to the thresher, and means connecting said arm in the thresher axle whereby when the latter is rocked to raise the thresher the pick-up arm will be simultaneously lowered.

9. In combination, a vehicle, a windrow pick-up which is adapted to be pushed by said vehicle, and means for mechanically interconnecting said pick-up and said vehicle in such manner that when said pick-up is pushed by said vehicle it shall be free to rock substantially independently of said vehicle about an axis extending generally parallel to, and lengthwise of, the line of vehicle travel, said interconnecting means including a pushing member affixed at one of its ends upon said vehicle and mechanically connected to said windrow pick-up at the other end thereof by means including a bearing connection which permits said pick-up to rotate relative to, and independently of, said pushing member.

10. In combination, a vehicle having an axle, a windrow pick-up which is adapted to be pushed by said vehicle, and means for mechanically interconnecting said pick-up and said vehicle, said interconnecting means including an elongated, generally horizontally extending pusher member affixed at one of its ends to said axle and connected at the other of its ends to said pick-up by means which permits said pick-up to rock substantially independently of said vehicle about an axis extending generally parallel to, and lengthwise of, the line of travel of said vehicle.

11. In combination, a vehicle having an axle, a windrow pick-up which is adapted to be pushed by said vehicle, and means for mechanically interconnecting said pick-up and said vehicle, said interconnecting means including an elongated, generaly horizontally extending pusher member connected at one of its ends to said axle by a universal coupling and connected at the other of its ends to said pick-up by means including a swivel whereby said pick-up is free to rock substantially independently of said pusher and said vehicle about an axis extending generally parallel to, and lengthwise of, the line of travel of said vehicle.

12. In combination, a vehicle, a windrow pick-up which is adapted to be pushed by said vehicle, said pick-up including a frame normally disposed in a generally upright position, and means for mechanically interconnecting said pick-up and said vehicle in such manner that when said pick-up is pushed by said vehicle it shall be free to rock substantially independently of said vehicle about an axis extending generally parallel to, and lengthwise of, the line of vehicle travel, said interconnecting means including a generally horizontally extending pusher member affixed at one of its ends to said vehicle, a carrying member which is adapted to engage said frame, and a swivel connection intermediate said carrying member and the other end of said pusher member.

13. In combination, a vehicle having an axle, a windrow pick-up normally disposed in a generally upright position and which is adapted to be pushed by said vehicle, the upper end of said pick-up being adapted to rest against said vehicle, roller means at the point of engagement at the upper end of said pick-up and said vehicle, and means for mechanically interconnecting said pick-up and said vehicle, said interconnecting means including an elongated, generally horizontally extending pusher member connected at one of its ends to said axle by a universal coupling and connected at the other of its ends to said pick-up by means including a swivel whereby said pick-up is free to rock substantially independently of said vehicle about an axis extending generally parallel to, and lengthwise of, the line of travel of said vehicle.

14. In combination, a vehicle, a windrow pick-up which is adapted to be pushed by said vehicle, and means for mechanically interconnecting said pick-up and said vehicle in such manner that when said pick-up is pushed by said vehicle it shall be free to rock forwardly and backwardly substantially independently of said vehicle about a generally horizontal axis arranged substantially perpendicularly to the line of travel of said vehicle, said interconnecting means including a pusher member supported at one of its ends on said vehicle, a carrying member pivotally connected to said pick-up, and means for connecting the other end of said carrying member to the other end of said pusher member.

15. In combination; a vehicle; a windrow pick-up which is adapted to be pushed by said vehicle; said pick-up including an elongated, generally rectangularly shaped frame normally disposed in a generally upright position, a conveyor or elevator, and means adjacent the lower end of said frame for removing material from the ground and directing said material into said conveyor or elevator, the upper end of said pick-up being adapted to rest against said vehicle; roller means at the point of engagement of the upper end of said pick-up and said vehicle; and means for mechanically interconnecting said pick-up and said vehicle in such manner that when said pick-up is pushed by said vehicle it shall be free to rock about a generally horizontal axis extending substantially perpendicularly to the line of vehicle travel; said interconnecting means including a generally horizontally extending, elongated pusher member affixed at one of its ends to said vehicle, a bifurcated carrying member, the spaced ends of which are pivotally connected to the frame of said pick-up, and means for connecting the other end of said carrying member to the other end of said pusher member.

16. In combination, a vehicle having an axle, a windrow pick-up which is adapted to be pushed by said vehicle, said pick-up including a frame normally disposed in a generally upright position, the upper end of said pick-up being adapted to rest against said vehicle, roller means at the point of engagement of the upper end of said vehicle and said pick-up, and means for mechanically interconnecting said pick-up and said vehicle in such manner that when said pick-up is pushed by said vehicle it shall be free to rock about a generally horizontal axis extending substantially perpendicularly to the line of vehicle travel, said interconnecting means including a generally horizontally extending, elongated pusher member connected at one of its ends to said axle by a universal coupling, a carrying member pivotally connected to the frame of said pick-up, and means for connecting the other end of said carrying member to the other end of said pusher member.

17. In combination; a vehicle; a windrow pick-up which is adapted to be pushed by said vehicle; said pick-up including an elongated, generally rectangularly shaped frame normally disposed in a generally upright position, a conveyor or elevator, and means for removing material from the ground and directing such material into said conveyor or elevator; and means for mechanically interconnecting said pick-up and said vehicle in such manner that when said pick-up is pushed by said vehicle it shall be free to rock substantially independently of said vehicle about an axis extending generally parallel to, and lengthwise of, the line of vehicle travel and shall also be free to rock forwardly and backwardly substantially independently of said vehicle about a generally horizontal axis arranged substantially perpendicularly to the line of vehicle travel; said interconnecting means including an elongated pusher member affixed at one of its ends upon said vehicle, a carrying member pivotally connected to said frame, and a swivel connection intermediate said carrying member and the other end of said pusher member.

18. In combination; a vehicle having an axle; a windrow pick-up which is adapted to be pushed by said vehicle; said pick-up including an elongated, generally rectangularly shaped frame normally disposed in a generally upright position, a conveyor or elevator, and means for removing material from the ground and directing such material into said conveyor or elevator, the upper end of said pick-up being adapted to rest against said vehicle; roller means at the point of engagement of the upper end of said pick-up and said vehicle; and means for mechanically interconnecting said pick-up and said vehicle in such manner that when said pick-up is pushed by said vehicle it shall be free to rock substantially independently of said vehicle about an axis extending generally parallel to, and lengthwise of, the line of vehicle travel and shall also be free to rock forwardly and backwardly substantially independently of said vehicle about a generally horizontal axis arranged substantially perpendicularly to the line of vehicle travel; said interconnecting means including a generally horizontally extending, elongated pusher member connected at one of its ends to said axle by means of a universal coupling, a bifurcated carrying member, the spaced ends of which are pivotally connected to the frame of said pick-up, and means including a swivel for connecting the other end of said carrying member to the other end of said pusher member.

WALLACE F. MacGREGOR.